Patented Dec. 28, 1926.

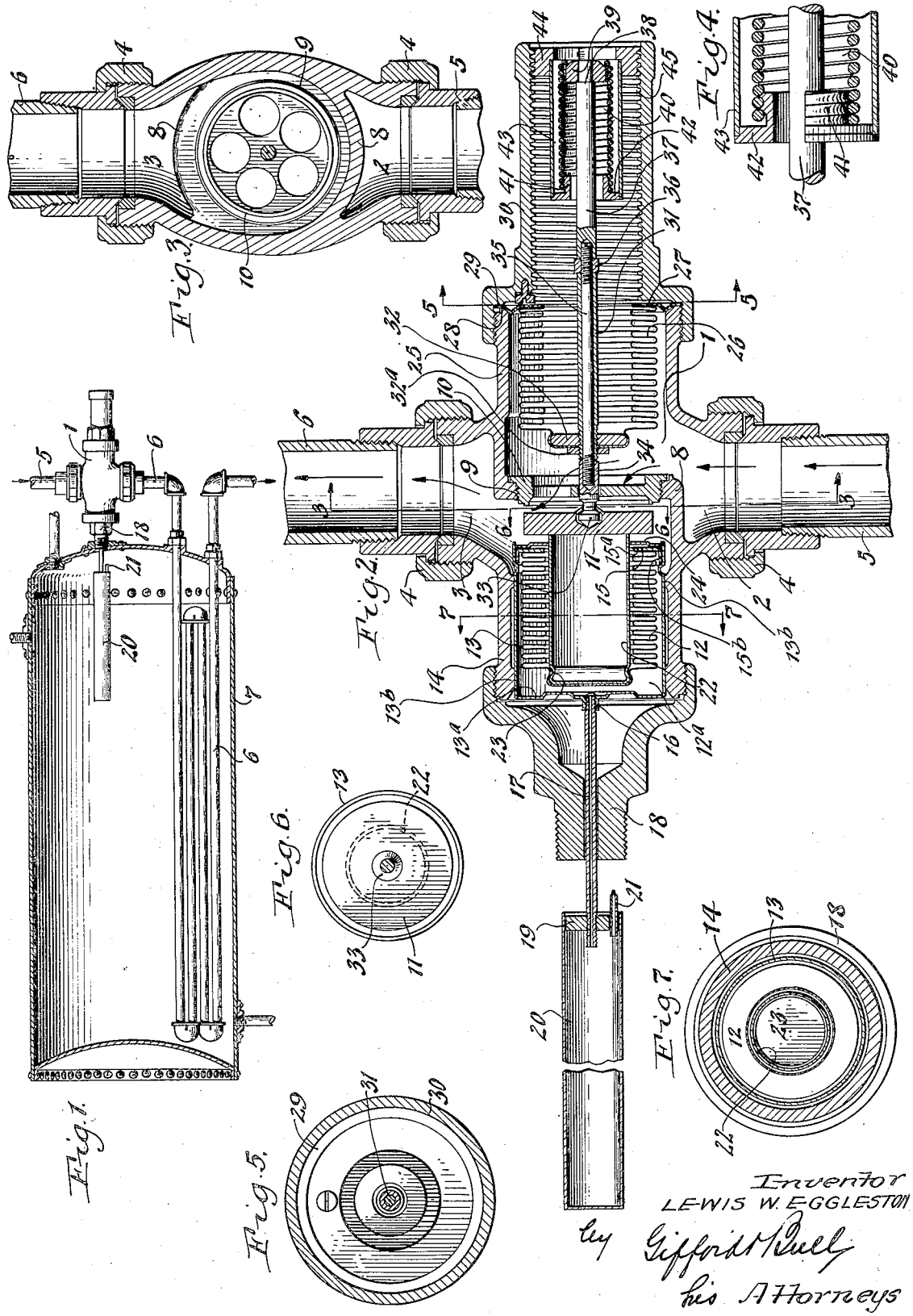

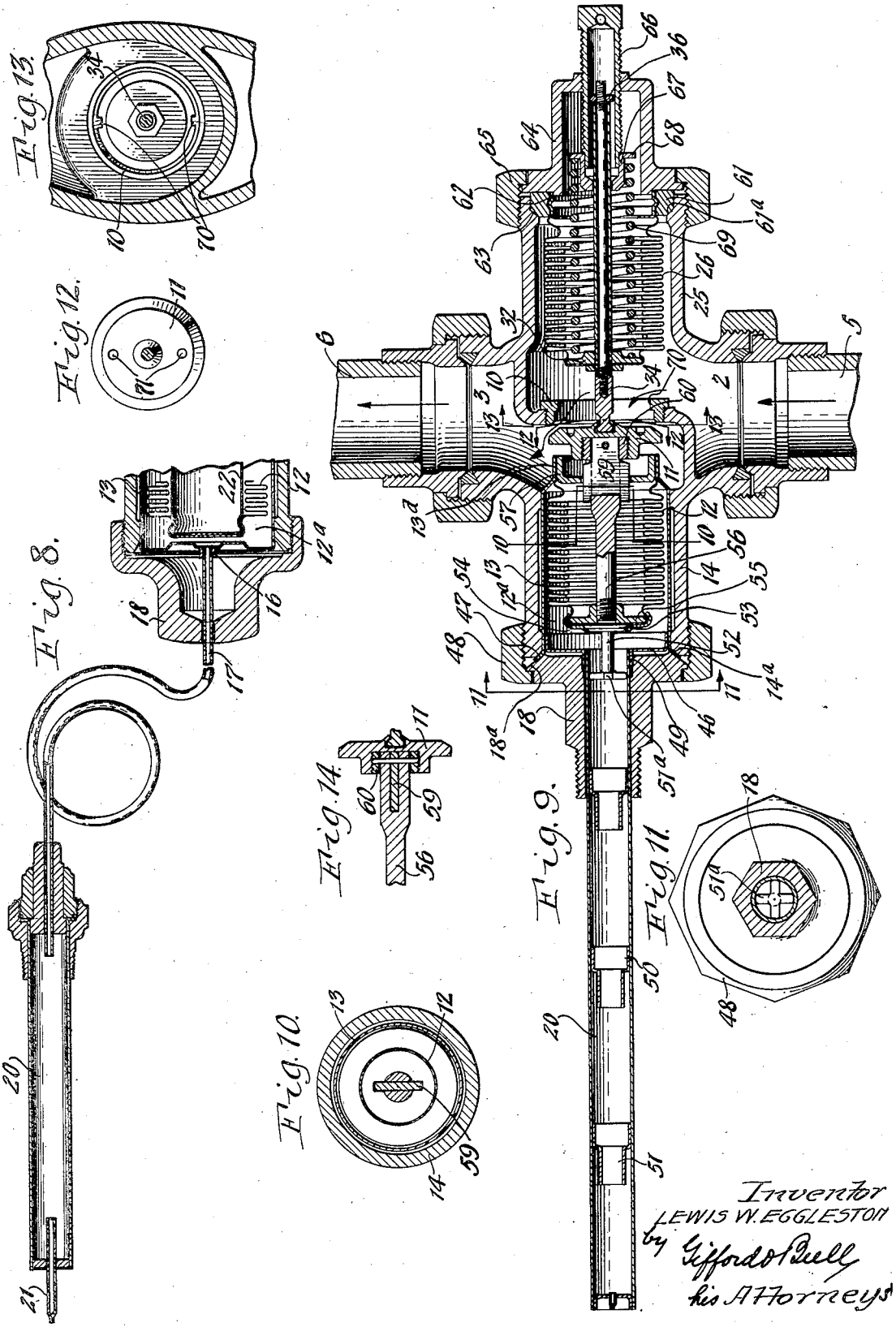

1,612,760

UNITED STATES PATENT OFFICE.

LEWIS W. EGGLESTON, OF BUFFALO, NEW YORK, ASSIGNOR TO AMERICAN RADIATOR COMPANY, OF NEW YORK, N. Y., A CORPORATION OF NEW JERSEY.

THERMOSTATIC VALVE-CONTROL APPARATUS.

Application filed October 14, 1921. Serial No. 507,786.

My invention pertains to thermostatically operated devices for controlling valves, and the embodiment thereof disclosed, while capable of wide application, is particularly designed for operating a valve controlling the admission of steam to the steam heat-pipes of a hot water tank.

For the purpose of disclosing my invention, I have illustrated certain embodiments thereof in the accompanying drawings, in which:

Figure 1 is a sectional view of a hot water tank showing an application of my controlling mechanism to the steam pipes thereof;

Fig. 2 is a longitudinal sectional view of the controlling device;

Fig. 3 is a sectional view taken on the line 3—3 of Fig. 2;

Fig. 4 is an enlarged detail of the tension adjusting mechanism;

Fig. 5 is a sectional view taken on the line 5—5 of Fig. 2;

Fig. 6 is a sectional view taken on the line 6—6 of Fig. 2;

Fig. 7 is a sectional view taken on the line 7—7 of Fig. 2;

Fig. 8 is a sectional view of a modification showing the valve separated from the thermosensitive container;

Fig. 9 is a sectional view of a modified embodiment of my invention;

Fig. 10 is a sectional view taken of the line 10—10 of Fig. 9;

Fig. 11 is a sectional view taken on the line 11—11 of Fig. 9;

Fig. 12 is a sectional view on the line 12—12 of Fig. 9;

Fig. 13 is a sectional view on line 13—13 of Fig. 9, and

Fig. 14 is a detail sectional view of the valve stem.

In the preferred embodiment of the invention illustrated the valve casing 1 is provided with an inlet port 2 and an outlet port 3 connected by suitable unions 4 respectively with the steam supply pipe 5 and the steam heating elements, for example in the form of coils or loops 6 for heating the water in a hot water tank 7. The casing is provided with a partition 8 in which is formed a valve port 9 having screw-threaded therein a valve seat 10. Cooperating with the valve seat 10 is a valve disc 11 which is operated in one direction by a pressure responsive device constituting a power member and comprising an expansible-collapsible member 12 and a cylinder 13 surrounding it. The expansible-collapsible member 12 has one end closed and the other end open and intermediate of its ends is corrugated so that variations of pressure exerted thereon cause it to expand and collapse. The member 12 together with the cylinder 13 having its inner end open and its opposite end closed by an integral head 13$^a$, form a chamber 12$^a$ subject to the heat of the heat supply, i. e. of the steam supplied through the casing 1. This cylinder 13 snugly fits within an extension 14 of the casing suitable spacing ribs 13$^b$ being provided on the inner face of said extension for properly positioning said cylinder. The open end of the expansible-collapsible member 12 is secured to the open end of cylinder 13 by means of a closure ring 15 (see Fig. 2), one portion 15$^a$ of which is soldered or brazed to the expansible-collapsible member and the other portion 15$^b$ of which is soldered or brazed to the inner wall of the cylinder 13, thereby forming such a joint at this point that the chamber 12$^a$ will be gas tight. The end closure wall or head 13$^a$ of the cylinder 13, is provided with an interiorly screw-threaded nipple 16 into which is threaded a hollow stem 17, which projects through the securing stem or head 18 of the casing extension 14 and is screw-threaded into the head 19 of a thermosensitive tube or container 20 constituting a vapor pressure-generating member, said stem 17 being centered in the head 19 and projecting interiorly of said tubes beyond the head so that in event the tube 20 is used either in a horizontal or in a vertical position, the volatile liquid with which it is adapted to be charged will not flow through the stem and out of the tube. The tube 20 is provided with a filling stem 21 through which it is adapted to be charged with a volatile liquid, and after the charge is inserted the end of the filling stem 21 is seated by being pinched together and soldered.

A cylindrical member 22 is arranged within the member 12 and is formed with a head 23 expanded into the head of the expansible-collapsible member 12$^a$ so as to be rigidly connected to the latter, thereby providing an operating connection between the expansible-collapsible member 12 and the valve disk 11. The outer end of this member 22 engages the face of the valve disk 11, and is guided by an annular member 24 brazed or soldered to the ring 15.

The opposite side of the casing from the extension 14 is provided with an extension 25 similar to the said extension 14, and arranged within the latter is a flexible, corrugated, expansible-collapsible closure or sealing member 26, secured at its outer or open end by brazing or soldering to a ring 27 which ring is clamped between a shoulder 28 on the casing extension 25 and a shoulder 29 on the bonnet 30 which is threaded onto extension 25.

The expansible-collapsible member 26 has extending through the closed end thereof a tubular clamping member 31, one end of which is screw-threaded to receive the nuts 32 and 32ª between which the head of the expansible-collapsible member 26 is clamped. The valve disk 11 has connected therewith, by a ball-and-socket joint 33, a stem formed in three sections, namely, the section 34, which carries the ball of the said ball-and-socket joint, and has a screw-threaded socket to receive one end of the reduced stem section 35 which passes through the clamping member 31, and which stem at its outer end, is screw-threaded to receive a nut 36 between which and a shoulder formed on the section 34, the clamping member 31 is secured to connect the head of the expansible-collapsible member to the valve stem for movement therewith. The third section 37 of the stem has one end socketed and screw-threaded to receive the outer threaded end of the section 35, and said section 37 has its outer end reduced to form a shoulder 38 against which abuts a collar 39 fitting the said reduced end. One end of a coiled tension spring 40 fits over the collar 39, the said end being reduced or contracted to prevent it slipping off the collar, and the other end of the spring being threaded on a collar 41 loosely surrounding the valve stem 37 and having a shouldered flange 42. One end of a tubular bearing member 43 is socketed in a nut 44 operating on the internal threads 45 of the bonnet 30 and the opposite end of this bearing member engages the flange 42 so that as the nut 44 is turned to adjust its position lengthwise of the bonnet 30, the coiled spring is placed under varying degrees of tension to oppose the closing force exerted on the valve 11 by the pressure operated member 12. The above arrangement provides for sealing the casing against the escape of steam past the spring operated stem and at the same time admits of ready access to the valve and its seat for the purpose of repair or replacement without disconnecting the apparatus from the supply and discharge pipes. The removal of the bonnet 30 carries with it the nut 44 and bearing member 43 and leaves exposed the sectional stem and spring. The two collars 39 and 41 and the spring 40 are readily lifted from position after which the section 37 and the nut 36 may be removed, the stem sections 35 being made long enough to bring the nut well beyond the expansible-collapsible member 26. The removal of the nut 36 disconnects the tubular clamping member 31 from the stem and the expansible-collapsible member 26 may then be lifted out exposing the valve seat 10 which may be unscrewed and lifted out to permit the removal of the valve 11.

It will be noted that the spring 40 is under tension and not under compression to provide the opening force for the valve disc 11, and any tendency of the spring to buckle to throw the spring operated stem out of alignment and cause the parts to bend at any point is obviated.

In the embodiment illustrated in Figs. 9 to 13, the cylinder 13 instead of having an integral head has one end closed by a cup-shaped head 46 fixed to the cylinder, which has its edge flared as at 47 to provide a flange to be clamped between the chamfered shoulders 18ª on the extension 14 and head 18 respectively. The head 18 in this instance is held on by a suitable union coupling 48.

The thermosensitive tube 20 is directly connected to the head 46, being soldered or brazed in a neck 49 on the head 46, and to prevent all of the volatile liquid, with which the tube 20 is charged, from ever flowing into the chamber 12ª, a plurality of pockets are formed in the tube by means of small tubular inserts 50, secured in the tube and each of said inserts having reduced central neck portions 51 spaced from the internal surface of said tube.

In this embodiment of the invention the expansible-collapsible member 12 on its closed end is provided with a guide, comprising a plurality of radial arms 51ª (see Fig. 9), mounted on one end of a stem 52, which is provided at its opposite end with a disc 53, clamped between the closed end or head of the expansible-collapsible member 12 and a clamping disc 54, having its edges turned over the end of the expansible-collapsible member. Within the head of the expansible-collapsible member, I provide a reenforcing disc 55, held by the metal of the head being clamped about the same, and having an internally screw-threaded opening arranged to receive one end of the threaded stem 56 of the valve disc 11. This stem at its opposite end passes through a guide 57, comprising a cup-shaped closure member having a central aperture. The end of the cylinder 13 is reduced at that point to form a neck 13ᵈ into which the open end of the expansible-collapsible member 12 and the guide 57 fit, the parts being all soldered or brazed together to form a gas tight joint between the expansible-collapsible member and the cylinder, so that the chamber 12ª will be gas tight. To prevent the stem 56 from rotating, the guide 57 is provided on opposite sides of its central opening with slots in which operate wings 59, carried by the stem 56. The stem 56 is provided at its end with a collar 60, which is screw-threaded into a threaded socket on the valve disc 11 (see Fig. 14).

The expansible-collapsible closure member 26 in the modified structure is held in position in a slightly different manner than illustrated in Fig. 2. In the modified structure, the neck of the expansible-collapsible member is secured to a ring 61 by means of an internal expanded ring 62, the neck of the expansible-collapsible member, the internal ring 62 and ring 61 all being soldered or brazed together to make a steam tight joint. The ring 61 is provided with a chamfered surface 61ª arranged to engage with a chamfered shoulder 63 on the housing extension 25 and is held in position by the bonnet 64 engaging said ring, and secured on the extension 24 by a coupling-union 65.

Instead of providing a tension spring as in the structure illustrated in Fig. 2, I provide a compression spring and for this purpose the bonnet 64 has extending through the outer end thereof an adjustable screw 66, threaded into the bonnet, and having on its inner end a collar 67. Engaging a flange 68 on this collar is one end of a compression coiled spring 69, the opposite end of which bears on the disc 32 in the head of the expansible-collapsible member 26. The manner of securing the head of the expansible-collapsible member 26 to the valve disc 11 is the same as illustrated in the structure shown in Fig. 2.

For the purpose or removing the valve seat 10 and the valve disc 11, it is merely necessary to remove the bonnet 64 after which the coiled spring 69 may be removed, and by unscrewing the nut 36, the expansible-collapsible member 26 is then disconnected from the stem 34, permitting the removal of the expansible-collapsible member 26 and exposing the valve seat and valve disc. The valve seat is provided with a pair of integrally projecting lugs 70 (see Fig. 13), arranged to be engaged by the fingers of a wrench for unscrewing the valve seat, and the valve disc 11 is provided with a pair of oppositely disposed sockets 71 (see Fig. 12), into which fingers of a specially formed wrench may be inserted for unscrewing the valve from the stem 56, the said stem being held from rotation by means of the wings 59 thereon, which engage the slots in the guide member 57.

In operation, the thermosensitive tube 20 having been charged with a comparatively small quantity of volatile liquid, is inserted in the tank 7 where it is subject to the influence of the temperature of the water or other liquid, the temperature of which is to be maintained by the heating coil 6 at a predetermined point. The port 2 is connected to the steam supply pipe 5 and the discharge port 3 to the pipe 6 leading to the heating coils 6 in the tank, and employed to heat the liquid in the tank. During normal operating conditions the chamber 12ª is always maintained at a greater temperature than the thermosensitive tube 20 due to the fact that said chamber is subject to the temperature influence of the steam on the supply side of the valve, which steam is at a higher temperature than the interior of the tank or the liquid therein. Although, the steam does not come in direct contact with the member 12 or the cylinder 13, the chamber 12ª is heated by conduction, sufficient heat being transmitted through the metal parts to maintain the temperature of said chamber above that of the tube 20.

Assuming that the water in the tank is cold, the volatile in the tube 20 will be in liquid condition and no pressure will be created to exert its force on the member 12, under which conditions the spring 40 (Fig. 2) or 69 (Fig. 9) will maintain the valve disc 11 in open position admitting steam to the heating coils 6. When the temperature of the liquid in the tank 7 reaches the point at which it is to be maintained or which it is not to exceed, the heat volatilizes the liquid in the tube 20, the resulting vapor passing into the chamber 12ª and exerting pressure to collapse the expansible-collapsible member 12 to close the valve 11. If for any reason the temperature of the water in the tank drops below the predetermined point, due to drawing of the hot water and the consequent admission of cold water, the pressure in the tube 20 will drop by reason of the chilling of the volatilized liquid, and said liquid in tube 20 commences to condense. As the pressure in the tube 20 falls below that in the chamber 12ª, the volatilized liquid in the said chamber will flow back into the tube 20, thereby relieving the pressure on the expansible-collapsible member and permitting the valve to be opened by the coiled spring 40.

At no time is the pressure in the chamber 12ª greater than that in the tube 20, even though the temperature of the chamber is greater than that of the tube, for the reason that while the vapor in the chamber 12ª may be heated to a greater extent than that in the tube 20, it will not build up pressure in the chamber even though the vapor when further heated in the chamber does slightly expand, because with a smaller pressure in the tube this additional expansion of the vapor in the chamber will merely extend back into the tube until the pressure in the tube and chamber are equalized.

I have shown the tube and its connecting conduit both extending into the tank and the conduit extremely short. This, however, is not essential as the conduit may be made any length desired without affecting the operation of the apparatus. Or, if desired, the conduit may be eliminated entirely and the tube be directly connected with the chamber of the pressure responsive member constituting the power element, as shown in Fig. 9. The length of the conduit does not affect the operation of the apparatus nor does the temperature to which the conduit is subjected affect the intended operation. The valve and pressure responsive member may be located at some distance from the point at which the temperature is to be maintained, as shown in Fig. 8, in which event the conduit would be extremely long and may be subjected to other temperatures than those to which the tube and member 12 are subjected. The raising of the temperature in the conduit however will merely slightly expand the vapor passing therethrough and if the pressure is increased it will be exerted backward into the tube 20 until sufficient pressure is created in the tube to exert the pressure forward into the chamber 12$^a$ of the pressure-responsive element. The vapor passing through the conduit may be even liquefied due to the passage of the tube through a chilling temperature without affecting the operation of the device. Under such circumstances the liquid which would be caused to flow into the chamber 12$^a$ by the pressure behind it is immediately again vaporized in this chamber by the heat thereof until a pressure is built up in said chamber which is equal to the pressure in the thermosensitive tube.

The apparatus may be placed in any position without affecting its operation. I have shown it placed horizontally but if desired, it may be placed vertically with the thermosensitive tube above or below the valve casing. The tube is charged with sufficient volatile liquid so that the conduit may be completely filled with liquid due to liquefaction of the vapor generated in its passage from the tube to the chamber and enough remain in the tube to create an operating pressure by volatilization at the predetermined temperature, but the quantity of the charge is not so great as to completely fill the tube and the conduit as the operating pressure is created by the volatilization of the liquid in the tube. Due to the construction of the tube, in event the tube is placed above the chamber, there will always remain in the tube sufficient liquid to create an operating pressure.

Under normal operating conditions there is never any liquid contained in the chamber 12$^a$, as this chamber is heated to such an extent that any liquid which might pass into it is immediately volatilized. However, conditions might arise where the heat supply is turned off and the chamber 20 therefore cools more quickly than the tube. A specific example of this would be in event the operator shut off the steam supply in the supply line, under which conditions the chamber would cool more quickly than the tube and a certain portion, at least, of the vapor be condensed in the chamber. With this condition existing, however, as soon as the steam supply is again turned on, the chamber 12$^a$ is heated by the steam and the liquid in said chamber again volatilized. As the tube 20 is cooler, the vapor of the volatilized liquid in the chamber immediately flows to the tube, this being the low pressure side, and is condensed in the tube. Pressure, therefore, can not build up in the chamber 12$^a$ to hold the valve closed unless the pressure in the tube reaches the operating point by the volatilization of the liquid in the tube 20 at the temperature to be maintained.

Having thus described my invention, what I claim as new and desire to secure by Letters Patent is:

1. A device of the character described comprising a valve casing, a valve operable therein for controlling a heat supply flowing through the casing, a vapor pressure-generating member containing a volatile liquid, and an expansible-collapsible vapor pressure-responsive member in the valve casing and subject to the temperature of the heat supply flowing through the casing and arranged to operate said valve, said pressure-responsive member being in communication with said vapor pressure-generating member to receive the vapor therefrom.

2. A device of the character described comprising a valve casing, a valve operable therein for controlling a heat supply flowing through the casing, a vapor pressure-responsive member in the valve casing and subject to the temperature of the heat supply flowing through the casing and arranged to operate said valve, said member including an expansible-collapsible wall, and a vapor pressure-generating container adapted to contain a volatile liquid, said member being in communication with said container to receive the vapor therefrom.

3. A device of the character described comprising a valve casing, a valve operable therein for controlling a heat supply flowing through the casing, a vapor pressure-responsive member in the valve casing and subject to the temperature of the heat supply flowing through the casing and arranged to operate said valve, said member including an expansible-collapsible wall, and a vapor pressure-generating container adapted to contain a volatile liquid, said member being in communication with said container to receive the vapor therefrom, and being so constructed and arranged as to be operable in one direction when the vapor pressure in said member equals the vapor pressure in said container.

4. A device of the character described comprising a valve casing, a valve operable therein for controlling a heat supply flowing through the casing, a vapor pressure-generating member containing a volatile liquid, an expansible-collapsible vapor pressure-responsive member in the valve casing and subject to the temperature of the heat supply flowing through the casing and arranged to close said valve, said pressure-responsive member being in communication with said vapor pressure-generating member to receive vapor therefrom, and spring means in the casing normally tending to move the valve to open position.

5. A device of the character described comprising a valve casing, a valve operable therein for controlling a heat supply flowing through the casing, a vapor pressure-generating member containing a volatile liquid, an expansible-collapsible vapor pressure-responsive member arranged to operate said valve, said pressure-responsive member being in communication with said vapor-pressure-generating member to receive the vapor therefrom, means whereby said pressure-responsive member is heated to maintain the vapor therein in volatile form so as to maintain a vapor pressure in said member equal to the vapor pressure in said vapor pressure-generating member, and means to prevent the volatile liquid from flowing from said generating member to said pressure-responsive member, but permitting passage of the vapor back and forth between said members.

6. A device of the character described comprising a valve casing, a valve operable therein for controlling a heat supply flowing through the casing, a vapor pressure-generating member containing a volatile liquid, an expansible-collapsible vapor pressure-responsive member in the valve casing and arranged to operate said valve, said pressure-responsive member being in communication with said generating member to receive the vapor therefrom, and means to prevent the volatile liquid from flowing from said generating member to said pressure-responsive member but permitting passage of the vapor back and forth between said members.

7. A device of the character described comprising a valve casing, a valve operating therein, a pressure operated expansible-collapsible member mounted in said casing, a valve stem member extending between said valve member and valve and detachably engaging the valve to actuate the latter, an expansible-collapsible member removably mounted within said casing on the opposite side of said valve and having its inner end detachably connected with the valve, and a coiled spring to move said valve to open position.

8. A device of the character described comprising a valve casing, a valve operating therein, a pressure-operated expansible-collapsible member mounted within said casing, a valve stem engaging said valve and connected with said expansible-collapsible member, an expansible-collapsible member removably mounted in said casing on the opposite side of said valve, a stem extending from said valve and connected with said member at its inner end and a coiled spring constantly tending to move said valve open.

9. A device of the character described comprising a valve casing, a valve operating therein, a pressure operated expansible-collapsible member arranged within said casing on one side of the valve and adapted to operate the valve, an expansible-collapsible removable closure member on the opposite side of the valve and closing the casing, means for detachably connecting the closure member with the valve, and means tending to open said valve and connected to said closure member.

10. A device of the character described comprising a valve casing, a removable seat mounted therein, a pressure operated member disposed in said casing on one side of said seat and detachably connected with the valve, a flexible closure member removably mounted in said casing on the opposite side of said valve, a stem detachably connected with the valve and extending through and detachably connected with the flexible closure member, and a spring mounted on the opposite side of the closure member and connected to said stem.

11. A device of the character described comprising a valve casing, a valve seat therein, a valve cooperating with said seat, a pressure-operated member mounted in said casing on one side of said valve and adapted to operate the valve, a flexible closure member removably mounted in said casing on the opposite side of said valve and detachably connected with said valve, an adjustable spring, and means for detachably connecting said spring with said flexible closure member.

12. A device of the character described comprising a valve casing, a valve seat therein, a valve cooperating with said seat, a pressure-operated member mounted in said casing on one side of said valve, and adapted to operatively engage the valve, a flexible closure member mounted in said casing on the opposite side of said valve, and having a tubular clamping member secured thereto and extending through said closure member, a stem connected at one end to the valve and extending through said tubular member, said stem having a shoulder and a nut at the opposite end of said stem between which and said shoulder said clamping member is secured.

13. A device of the character described comprising a valve casing having a valve seat therein, a valve cooperating with said seat, a pressure-operated member within said casing on one side of said valve and adapted to operatively engage the valve, an expansible-collapsible tubular closure member on the opposite side of said valve and having a closed end and an open end, means for removably securing the wall of said member at its open end to said casing, and means accessible from the open end for detachably connecting the closed end of said member to the said valve.

14. A device of the character described comprising a valve casing, a seat therein, a pressure-operated member mounted within said casing on one side of said seat, a valve cooperating with said seat and interposed between said pressure-operated member and seat and adapted to be engaged by said member, a valve stem connected with said valve and extending through said seat, an expansible-collapsible closure member for said casing on the opposite side of said seat, said closure member having a closed end and an open end, means for detachably securing said closure member at its open end to said casing, and means accessible from the open end of said closure member for detachably connecting said valve stem to the closed end of said member.

15. A device of the character described comprising a valve casing, a valve seat therein, a valve cooperating with said seat, a pressure-operated member mounted in said casing on one side of said valve and adapted to operatively engage the valve, a flexible closure member on the opposite side of said valve and connected to one side of said valve, a spring on the opposite side of said closure member tending to open said valve, and an adjusting member having a threaded connection with the valve casing for varying the tension of said spring.

16. A device of the character described comprising a valve casing having a valve seat therein, a valve cooperating with said seat, a pressure-operated member within said casing on one side of said seat and adapted to operatively engage said valve to seat the same, a flexible closure member on the opposite side of said seat, a stem connected to said valve and connected to and extending through said closure member, a bonnet for said casing, said bonnet being screw-threaded, a nut threaded in said bonnet, and a coiled spring having one end connected to said stem and the other end connected to said nut.

17. A device of the character described comprising a valve casing having a valve seat and oppositely disposed housings on opposite sides of said seat, a valve cooperating with said seat, a pressure-operated member disposed in one of said housings and operatively connected with said valve, an extension on said last named housing for securing the casing in position, a flexible closure member in the other housing for closing the latter, a stem connected to the valve and extending through and connected to said closure member, a bonnet removably secured to said other housing and removably holding said closure member in position, a nut adjustably operating in said bonnet, and a coiled spring connected at one end to the nut and at its other end to the stem.

18. A device of the character described comprising a valve casing having a valve seat therein, a valve cooperating with said seat, a pressure-operated member on one side of said seat operatively connected with said valve for closing said valve, a flexible closure member on the opposite side of said seat, a stem connected to said valve and said closure member and extending through said closure member, and a coiled tension spring tending to move said valve to its open position.

19. A device of the character described comprising a valve casing having a seat therein, a valve cooperating with said seat, a pressure-operated member disposed on one side of said seat for closing said valve, and operatively connected with said valve, a flexible closure member arranged on the opposite side of said seat, a stem connected to said valve, and closure member and extending through said closure member, an extension on said valve casing, a nut having a threaded engagement with said extension, and a coil tension spring having one end connected with said nut and the opposite end connected with said valve stem, said spring tending to move said valve to its open position.

20. A device of the character described comprising a valve casing having a seat therein and constructed for passage of a fluid heating medium, a valve cooperable with said seat, a pressure chamber to one side of said valve and one wall of which comprises an expansible-collapsible member adapted to seat the valve, a receptacle external to said casing and adapted to be subjected to temperature conditions produced by said heating medium, said receptacle communicating with said chamber and containing a vaporizable liquid which at a determined temperature vaporizes to exert pressure on said expansible-collapsible element to cause the same to move the valve toward closed position, said pressure chamber being subjected to the temperature of the heating medium passing through the said casing, and spring means normally tending to move the valve to open position.

21. A device of the character described comprising a valve casing for passage of a fluid heating medium, a valve controlling flow of said medium, a pressure operated member in said casing and including a flexible wall movable in one direction to close said valve, said member being exposed to the medium flowing through the casing whereby the member is heated to the temperature of the medium, and a container adapted to be subjected to the temperature of the material heated by the heating medium and communicating with said member, said container containing a volatile liquid which at a determined temperature is adapted to vaporize and flow into said chamber to move said flexible wall to actuate said valve.

22. In combination, a receptacle adapted to contain a liquid to be heated, a circulatory heating element therein, and means for regulating the flow of heating medium through said element, said means comprising a valve casing through which heating medium flows to said element, a valve in said casing and controlling flow of heating medium, a pressure chamber in said casing and including an expansible-collapsible member adapted to seat the valve, said chamber being constructed and arranged to be heated by the heating medium to the temperature of said medium, a container in said receptacle and subject to temperature of the liquid therein, and containing a volatile liquid, said container communicating with said chamber, said volatile liquid at a determined temperature vaporizing and flowing into said pressure chamber to exert pressure on said expansible-collapsible element to operate the valve, and spring means normally tending to move the valve to open position.

In witness whereof, I have hereunto subscribed my name in the presence of two witnesses.

LEWIS W. EGGLESTON.